(12) United States Patent  
Kurata et al.

(10) Patent No.: US 7,901,497 B2
(45) Date of Patent: Mar. 8, 2011

(54) WATER-SOLUBLE NAPHTHALOCYANINE COLORING MATTER AND WATER-BASED INK CONTAINING THE SAME

(75) Inventors: Takaaki Kurata, Tokyo (JP); Takashi Yoneda, Tokyo (JP); Takafumi Fujii, Tokyo (JP); Tadayuki Kiyoyanagi, Tokyo (JP); Koji Hirota, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/734,038

(22) PCT Filed: Oct. 30, 2008

(86) PCT No.: PCT/JP2008/003102
§ 371 (c)(1),
(2), (4) Date: Apr. 6, 2010

(87) PCT Pub. No.: WO2009/060573
PCT Pub. Date: May 14, 2009

(65) Prior Publication Data
US 2010/0236448 A1   Sep. 23, 2010

(30) Foreign Application Priority Data

Nov. 7, 2007   (JP) .................... 2007-289294
Jul. 31, 2008  (JP) .................... 2008-197719

(51) Int. Cl.
C09D 11/00 (2006.01)
C09D 11/02 (2006.01)
C09B 47/04 (2006.01)

(52) U.S. Cl. ................... 106/31.49; 540/127
(58) Field of Classification Search ........... 106/31.49; 540/122, 127, 135
See application file for complete search history.

(56) References Cited

U.S. PATENT DOCUMENTS

| | | | |
|---|---|---|---|
| 2,761,868 A * | 9/1956 | Lacey | 540/123 |
| 3,589,924 A * | 6/1971 | Giambalvo et al. | 540/123 |
| 4,221,606 A * | 9/1980 | Funatsu et al. | 540/123 |
| 4,448,607 A * | 5/1984 | Johnson et al. | 540/123 |
| 4,518,672 A * | 5/1985 | Urawa et al. | 540/123 |
| 4,536,219 A * | 8/1985 | Riou et al. | 106/31.19 |
| 4,648,992 A * | 3/1987 | Graf et al. | 540/127 |
| 5,264,032 A * | 11/1993 | Dietz et al. | 540/127 |
| 5,279,654 A * | 1/1994 | Keirs et al. | 106/31.67 |
| 5,739,319 A * | 4/1998 | Yamasaki | 540/140 |
| 7,122,076 B2 | 10/2006 | Vonwiller et al. | |
| 7,255,733 B2 * | 8/2007 | Shiromaru et al. | 106/412 |
| 7,585,361 B2 * | 9/2009 | Yoneda et al. | 106/31.47 |
| 7,591,888 B2 * | 9/2009 | Fujii et al. | 106/31.47 |
| 2004/0260083 A1 | 12/2004 | Shiromaru et al. | |
| 2010/0112218 A1 * | 5/2010 | Fujii et al. | 106/31.47 |
| 2010/0126377 A1 * | 5/2010 | Yoneda et al. | 106/31.49 |

FOREIGN PATENT DOCUMENTS

GB       1502884   *   3/1978
(Continued)

OTHER PUBLICATIONS

Derwent abstract of JP 02/039990, Feb. 1990.*
(Continued)

Primary Examiner — Helene Klemanski
(74) Attorney, Agent, or Firm — Nields, Lemack & Frame, LLC

(57) ABSTRACT

The present invention relates to an aqueous solution composition (water-based ink composition) containing a water-soluble naphthalocyanine coloring matter represented by the following formula (1):

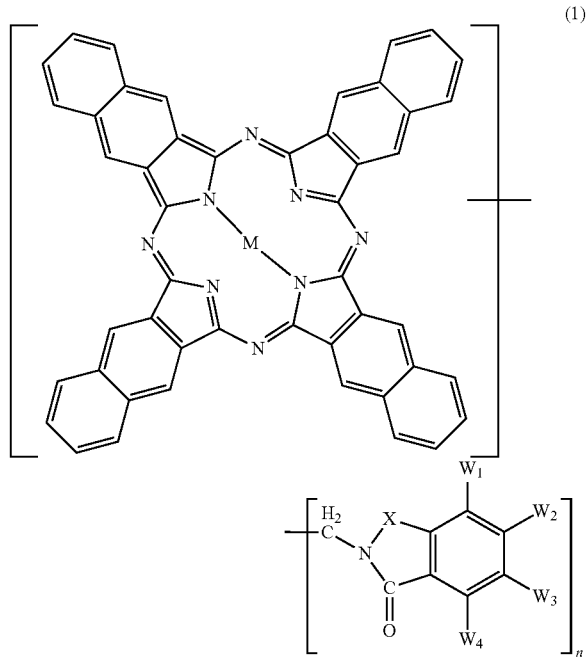

wherein, M represents a hydrogen atom, a metal atom, a metal oxide, a metal hydroxide or a metal halide, X represents a carbonyl group or a sulfonyl group, $W_1$ to $W_4$ are each independently a hydrogen atom, an ionic hydrophilic group or the like, at least one of $W_1$ to $W_4$ is a group other than a hydrogen atom, and n represents an integer number of 1 to 24, respectively, or a salt thereof, and a novel naphthalocyanine coloring matter, and said compound is useful as a near-infrared ray absorbent because it has a high absorption in the near-infrared region, and it is useful as a near-infrared ray absorbing water-based ink because it has an excellent storage stability in aqueous solution.

10 Claims, No Drawings

FOREIGN PATENT DOCUMENTS

| | | |
|---|---|---|
| JP | 2-39990 A | 2/1990 |
| JP | 2-167791 A | 6/1990 |
| JP | 4-33887 A | 2/1992 |
| JP | 2004-231832 A | 8/2004 |
| JP | 2005-29787 A | 2/2005 |
| JP | 2007-186681 A | 7/2007 |

OTHER PUBLICATIONS

International Search Report dated Jan. 27, 2009 in corresponding application (PCT/JP2008/003102).

International Preliminary Examination Report dated Jul. 1, 2010 in a corresponding application (PCT/JP2008/003102).

* cited by examiner

WATER-SOLUBLE NAPHTHALOCYANINE COLORING MATTER AND WATER-BASED INK CONTAINING THE SAME

TECHNICAL FIELD

The present invention relates to a water-soluble naphthalocyanine coloring matter having absorption in the near-infrared region or a salt thereof, and a water-based ink composition containing this.

BACKGROUND ART

Various industrial applications of a near-infrared ray absorbing coloring matter having absorption in a near-infrared region of 700 to 2000 nm have been conventionally under consideration. Specifically, it is used for application to light information recording medium such as CD-R, for printing application such as thermal CTP, fixing of a flash toner and laser thermal recording, and for heat blocking film and the like. Additionally, it is also used for near-infrared ray cutting filters used for PDP filters and the like, films for plant growth regulation, and the like, by taking advantage of the properties that it selectively absorbs lights in a certain wavelength range. On the other hand, it is also possible to use a near-infrared ray absorbing coloring matter as a near-infrared ray absorbing ink by dissolving or dispersing it in a solvent. A printed matter with said ink is difficult to recognize by visual observation and can be read only by a near-infrared ray detector or the like, so said ink is used for printing or the like for the purpose of, for example, anti-counterfeiting or the like.

Inks are classified broadly into water-based inks and organic solvent-based inks on the basis of the main component in a solvent, and use of a water-based ink is strongly desired in terms of environmental problems so development of a near-infrared ray absorbing coloring matter which is soluble in water is desired.

As a near-infrared ray absorbing coloring matter, immonium coloring matter, diimmonium coloring matter, dithiol metal complex coloring matter, cyanine coloring matter and the like are known, and particularly, as a near-infrared ray absorbing coloring matter having a high fastness, naphthalocyanine coloring matter is known.

A known naphthalocyanine coloring matter is a pigment the most of which is insoluble in a solvent or a coloring matter exhibiting solubility only in an organic solvent (see Patent Literature 1, for example), and almost no naphthalocyanine coloring matter exhibiting good solubility in water has been known.

In the examples of Patent Literatures 2 and 3, a water-soluble naphthalocyanine coloring matter is obtained by sulfonation of a naphthalocyanine coloring matter. This compound is dissolved in water, but when it is formulated into a water-based ink composition, its storage stability is poor and it is not in practical use.

Patent Literature 1: JP 2507786 B
Patent Literature 2: JP H2-167791 A
Patent Literature 3: U.S. Pat. No. 7,122,076

DISCLOSURE OF THE INVENTION

Problems to be Solved by the Invention

The present invention has been made in view of the above described circumstances, and an object of the present invention is to provide a water-soluble naphthalocyanine coloring matter having an absorption in the near-infrared region easily and at a low cost. Also, it is to provide an aqueous solution composition or/and a water-based ink composition containing said water-soluble naphthalocyanine coloring matter and having an excellent storage stability and an increased utility value in industry.

Means of Solving the Problems

The inventors of the present invention have intensively studied to solve the above problems and found that a water-soluble naphthalocyanine coloring matter shown in a certain formula and a water-based ink composition containing it can solve the above problems, and thus the present invention has been completed.

That is, the present invention relates to;
(1) A water-based ink composition containing a water-soluble naphthalocyanine coloring matter represented by the following formula (1) or a salt thereof:

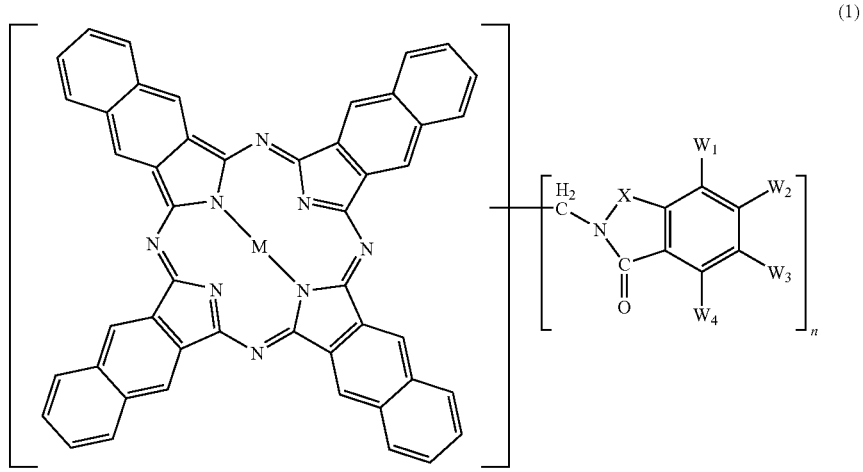

(1)

(wherein, M represents a hydrogen atom, a metal atom, a metal oxide, a metal hydroxide or a metal halide, X represents a carbonyl group or a sulfonyl group, $W_1$ to $W_4$ each independently represent a group selected from the group consisting of a hydrogen atom, an ionic hydrophilic group, a group having an ionic hydrophilic group as a substituent, and a hydroxy group; and at least one of $W_1$ to $W_4$ is a group other than a hydrogen atom, and n represents an integer number of 1 to 24, respectively),

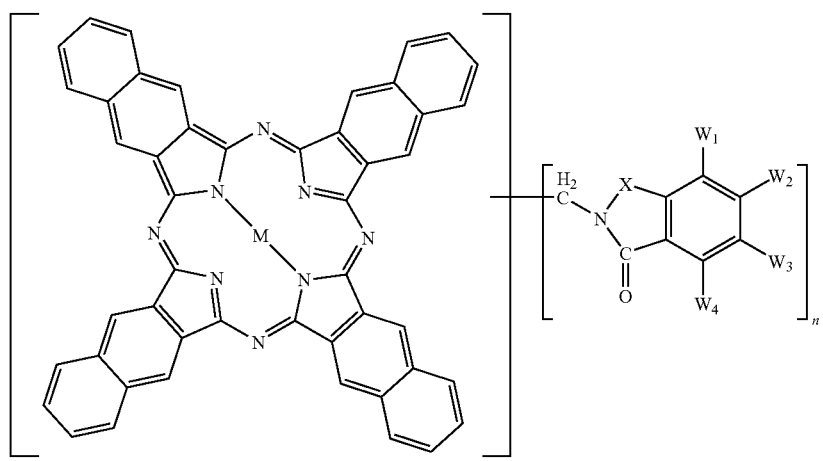

(2) The water-based ink composition containing the water-soluble naphthalocyanine coloring matter or a salt thereof according to the above (1), wherein in the formula (1), $W_1$ to $W_4$ are hydrogen atoms, at least either $W_2$ or $W_3$ is a group selected from the group consisting of an ionic hydrophilic group or a group having an ionic hydrophilic group as a substituent, and a hydroxy group; and the rest of $W_2$ or $W_3$ is a hydrogen atom, (3) The water-based ink composition containing the water-soluble naphthalocyanine coloring matter or a salt thereof according to the above (1) or (2), wherein in the formula (1), $W_1$ to $W_4$ each independently represent a hydrogen atom or a group represented by the following formula (2):

$$-\overset{O_2}{S}-L-R \quad (2)$$

(wherein, L represents a substituted or unsubstituted alkylene group having a total carbon number of C1 to C20; a substituted or unsubstituted cycloalkylene group having a total carbon number of C3 to C20; a substituted or unsubstituted alkenylene group having a total carbon number of C2 to C20; a substituted or unsubstituted alkynylene group having a total carbon number of C2 to C20; a substituted or unsubstituted aralkylene group having a total carbon number of C7 to C20; a substituted or unsubstituted phenylene group having a total carbon number of C6 to C18; a substituted or unsubstituted naphthylene group having a total carbon number of C10 to C20; or a substituted or unsubstituted divalent heterocyclic group having a total carbon number of C4 to C12, and R represents an ionic hydrophilic group, respectively)

and at least any one of $W_1$ to $W_4$ is a group represented by the above formula (2), (4) The water-based ink composition according to any one of the above (1) to (3), which contains water and a water-soluble organic solvent, (5) The water-based ink composition according to any one of the above (1) to (4), which is for inkjet recording, (6) A water-soluble naphthalocyanine coloring matter represented by the following formula (1) or a salt thereof:

(wherein, M represents a hydrogen atom, a metal atom, a metal oxide, a metal hydroxide or a metal halide, X represents a carbonyl group or a sulfonyl group, $W_1$ and $W_4$ are hydrogen atoms, at least either $W_2$ or $W_3$ is a group selected from the group consisting of an ionic hydrophilic group, a group having an ionic hydrophilic group as a substituent, and a hydroxy group; and the rest of $W_2$ or $W_3$ is a hydrogen atom, n represents an integer number of 1 to 24, respectively;

provided that when X is a carbonyl group, the case that at least either $W_2$ or $W_3$ is a carboxy group is excepted), (7) The water-soluble naphthalocyanine coloring matter or a salt thereof according to the above (6), wherein in the formula (1), at least either $W_2$ or $W_3$ is a group represented by the following formula (2):

$$-\overset{O_2}{S}-L-R \quad (2)$$

(wherein, L is an unsubstituted alkylene group having a total carbon number of C2 to C6, and R represents an ionic hydrophilic group, respectively), (8) The water-soluble naphthalocyanine coloring matter or a salt thereof according to the above (7), wherein in the formula (1), X is a carbonyl group, n is 5 to 12, and R in the formula (2) is a sulfo group, (9) A water-soluble naphthalocyanine coloring matter represented by the following formula (1) or a salt thereof:

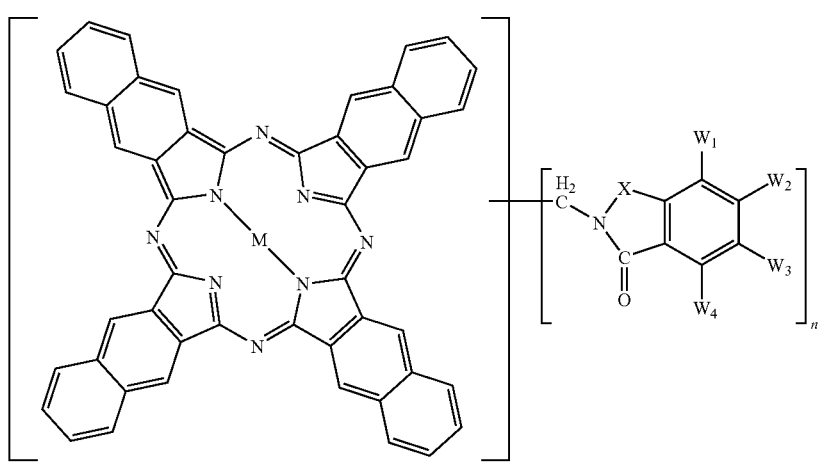

(1)

(wherein, M represents a hydrogen atom, a metal atom, a metal oxide, a metal hydroxide or a metal halide,
X represents a carbonyl group or a sulfonyl group,
$W_1$, $W_3$ and $W_4$ are hydrogen atoms,
$W_2$ is the following formula (2):

(2)

(wherein, L represents linear C2 to C6 alkylene and R represents a sulfo group), and n represents an integer number of 5 to 12),

(10) An aqueous solution composition containing the water-soluble naphthalocyanine coloring matter or a salt thereof according to any one of the above (6) to (9),

(11) A water-based ink composition, wherein the aqueous solution composition of the above (10) further contains a water-soluble organic solvent and an ink preparation agent,

(12) A near-infrared ray absorbent, wherein a water-soluble naphthalocyanine coloring matter represented by the following formula (1) or a salt thereof:

(wherein, M represents a hydrogen atom, a metal atom, a metal oxide, a metal hydroxide or a metal halide,
X represents a carbonyl group or a sulfonyl group,
$W_1$ to $W_4$ each independently represent a hydrogen atom or the following formula (2):

(2)

(wherein, L represents linear C2 to C6 alkylene, and R represents a sulfo group), and at least one of $W_1$ to $W_4$ is a group of the formula (2))
is an effective component.

Effect of the Invention

The water-soluble naphthalocyanine coloring matter represented by the above formula (1) of the present invention or a salt thereof has an excellent solubility in water and a water-soluble organic solvent. In addition, the aqueous solution composition and/or water-based ink composition of the present invention containing this compound is free from crys-

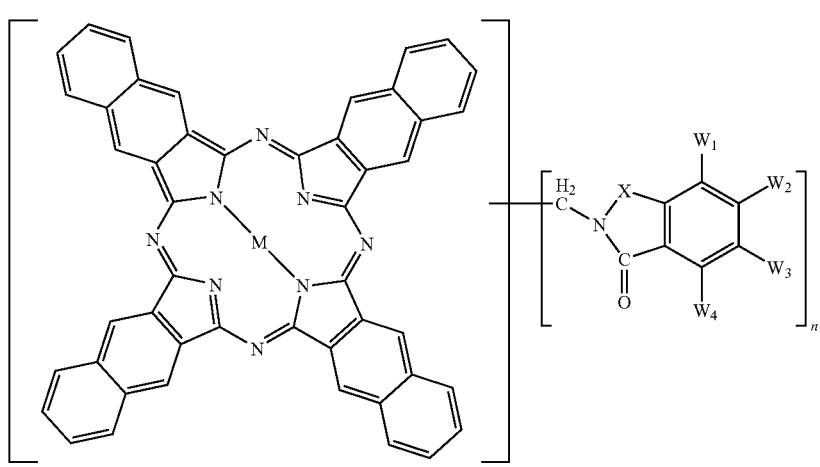

(1)

tal precipitation and change in physical properties and hue after storage for a long period of time, and thus has an extremely good storage stability.

BEST MODE FOR CARRYING OUT THE INVENTION

The present invention will be specifically explained.

In this regard, in the explanation of the present invention, the term "coloring matter" in phrases such as "water-soluble naphthalocyanine coloring matter of the formula (1)" and "coloring matter represented by the formula (1)" is a simplified expression of "coloring matter or a salt thereof" and used as meaning "coloring matter or a salt thereof" unless otherwise specifically noted. In addition, part(s) and % respectively represent part(s) and % by mass, unless otherwise specifically noted.

The water-based ink composition of the present invention is an aqueous solution (composition) where the water-soluble naphthalocyanine coloring matter of the above formula (1) is dissolved in water, and further may contain any additive for ink preparation. The water-soluble naphthalocyanine coloring matter of the formula (1) in the present invention is a coloring matter where a naphthalocyanine coloring matter is used as a mother nucleus and an N-methyl saccharin group or an N-methylphthalimide group having a benzene ring substituted by a water-soluble substituent, for example, an ionic hydrophilic group or/and a group substituted by an ionic hydrophilic group, and the like is introduced into said mother nucleus; and it has a high water-solubility and the storage stability of an aqueous solution dissolving said coloring matter is excellent, whereby it is very suitable for water-based ink compositions and the storage stability of said ink is extremely good.

In the above formula (1), M represents a hydrogen atom, a metal atom, a metal oxide, a metal hydroxide or a metal halide, X represents a carbonyl group or a sulfonyl group, $W_1$ to $W_4$ each independently represent a group selected from the group consisting of a hydrogen atom, an ionic hydrophilic group, a substituent having an ionic hydrophilic group and a hydroxy group; and at least one of $W_1$ to $W_4$ represents a group other than a hydrogen atom, and n represents an integer number of 1 to 24.

The above M represents a hydrogen atom, a metal atom, a metal oxide, a metal hydroxide or a metal halide.

Specific examples of the metal atom include, for example, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like.

The metal oxide includes VO, GeO and the like.

The metal hydroxide includes, for example, $Si(OH)_2$, $Cr(OH)_2$, $Sn(OH)_2$, AlOH and the like.

The metal halide includes, for example, $SiCl_2$, VCl, $VCl_2$, VOCl, FeCl, GaCl, ZrCl, AlCl and the like.

Among them, Fe, Co, Cu, Ni, Zn, Al, AlOH, V and VO are preferable, and Cu or VO is more preferable.

The above X represents a carbonyl group or a sulfonyl group, and a carbonyl group is preferable.

In the above $W_1$ to $W_4$, the "ionic hydrophilic group" includes a sulfo group, a carboxy group and a quaternary ammonium group, and a carboxy group and a sulfo group are preferable, and a sulfo group is particularly preferable. A carboxy group and a sulfo group may be in salt form, and examples of a counterion forming a salt include an alkali metal ion such as sodium ion and potassium ion; an organic cation such as tetramethyl ammonium ion; and the like.

In the above $W_1$ to $W_4$, the "group having an ionic hydrophilic group as a substituent" is not particularly limited and may be any as long as it has the above ionic hydrophilic group as a substituent and improves the water-solubility of the coloring matter. Due to this group, the coloring matter represented by the above formula (1) has a high water-solubility, and an ink composition or an aqueous solution composition containing said coloring matter has effects of the present invention such as sufficient storage stability.

Examples of the group having an ionic hydrophilic group as a substituent will be described below.

The group having an ionic hydrophilic group as a substituent includes the groups where the groups listed below are substituted by the above ionic hydrophilic group.

The listed groups includes a linear or branched C1 to C12 alkyl group; a linear or branched aralkyl group having a total carbon number of C7 to C18; a linear or branched C2 to C12 alkenyl group; a linear or branched C2 to C12 alkynyl group; a C3 to C12 cycloalkyl group; a C3 to C12 cycloalkenyl group; an aryl group; a heterocyclic group; an alkyloxy group; an aryloxy group; an acylamino group; an alkylamino group; an anilino group; a ureide group; a sulfamoylamino group; an alkylthio group; an arylthio group; an alkyloxycarbonylamino group; a carbamoyl group; an alkyloxycarbonyl group; a heterocyclic oxy group; an azo group; an acyloxy group; a carbamoyloxy group; a silyloxy group; an aryloxycarbonylamino group; an imide group; a heterocyclic thio group; a sulfinyl group; a phosphonyl group; an aryloxycarbonyl group; an acyl group; an alkylsulfonylalkyl group; an aryloxyalkyl group; a halogenoalkyl group; or groups represented by the above formula (2); and the like.

When the above group has an asymmetric carbon atom, it is preferred that the coloring matter having said group is in racemic form in terms of water-solubility.

Specific examples of the linear C1 to C12 alkyl group include, for example, methyl, ethyl, propyl, butyl, pentyl, hexyl, heptyl, octyl, nonyl, decyl, undecyl and dodecyl.

Specific examples of the branched C1 to C12 alkyl group include, for example, isopropyl, isobutyl, sec-butyl, t-butyl, isopentyl, isohexyl, isoheptyl, isooctyl, 2-ethyl hexyl, isononyl, isodecyl, isoundecyl, isododecyl and the like.

Specific examples of the linear aralkyl group having a total carbon number of C7 to C18 include benzyl, phenethyl, 2-naphthylethyl and the like.

Specific examples of the branched aralkyl group having a total carbon number of C7 to C18 include 2-methyl-3-naphthylbutyl, 2-anthrylbutyl and the like.

Specific examples of the linear C2 to C12 alkenyl group include vinyl, allyl and the like.

Specific examples of the branched C2 to C12 alkenyl group include isopropenyl, 2-octenyl and the like.

Specific examples of the linear C2 to C12 alkynyl group include ethynyl, propargyl and the like.

Specific examples of the branched C2 to C12 alkynyl group include isopropynyl, 2-octynyl and the like.

Specific examples of the C3 to C12 cycloalkyl group include cyclopropyl, 2-methylcyclopropyl, cyclobutyl, cyclopentyl, cyclohexyl and the like.

Specific examples of the C3 to C12 cycloalkenyl group include 2-cyclopenten-1-yl, 2-cyclohexen-1-yl, 4-methyl-2-cyclopenten-1-yl and the like.

Specific examples of the aryl group include, for example, phenyl, 4-t-butylphenyl, 2,4-di-t-amylphenyl and the like.

Specific examples of the heterocyclic group include, for example, imidazolyl, pyrazolyl, triazolyl, 2-furyl, 2-thienyl, 2-pyrimidinyl, 2-benzothiazolyl and the like.

Specific examples of the alkyloxy group include, for example, methoxy, ethoxy, 2-methoxyethoxy, 2-methanesulfonylethoxy and the like.

Specific examples of the aryloxy group include, for example, phenoxy, 2-methylphenoxy, 4-t-butylphenoxy, 3-nitrophenoxy, 3-t-butyloxycarbamoylphenoxy, 3-methoxycarbamoyl and the like.

Specific examples of the acylamino group include, for example, acetylamino, benzoylamino and the like.

Specific examples of the alkylamino group include, for example, methylamino, butylamino, diethylamino, methyl butylamino and the like.

Specific examples of the anilino group include, for example, an unsubstituted anilino, and a substituted anilino group such as 2-chloroanilino.

Specific examples of the ureide group include, for example, phenylureide, methylureide, N,N-dibutylureide and the like.

Specific examples of the sulfamoylamino group include, for example, N,N-dipropylsulfamoylamino and the like.

Specific examples of the alkylthio group include, for example, methylthio, octylthio, 2-phenoxyethylthio and the like.

Specific examples of the arylthio group include, for example, phenylthio, 2-butoxy-5-t-octylphenylthio, 2-carboxyphenylthio and the like.

Specific examples of the alkyloxycarbonylamino group include, for example, methoxycarbonylamino and the like.

Specific examples of the carbamoyl group include, for example, N-ethylcarbamoyl, N,N-dibutylcarbamoyl and the like.

Specific examples of the alkyloxycarbonyl group include, for example, methoxycarbonyl, butyloxycarbonyl and the like.

Specific examples of the heterocyclic oxy group include, for example, 1-phenyltetrazol-5-oxy, 2-tetrahydropyranyloxy and the like.

Specific examples of the azo group include, for example, phenylazo, 4-methoxyphenylazo, 4-pivaloylaminophenylazo, 2-hydroxy-4-propanoylphenylazo and the like.

Specific examples of the acyloxy group include, for example, acetoxy and the like.

Specific examples of the carbamoyloxy group include, for example, N-methylcarbamoyloxy, N-phenylcarbamoyloxy and the like.

Specific examples of the silyloxy group include, for example, trimethylsilyloxy, dibutylmethylsilyloxy and the like.

Specific examples of the aryloxycarbonylamino group include, for example, phenoxycarbonylamino and the like.

Specific examples of the imide group include, for example, N-succinimide, N-phthalimide and the like.

Specific examples of the heterocyclic thio group include, for example, 2-benzothiazolylthio, 2,4-di-phenoxy-1,3,5-triazole-6-thio, 2-pyridylthio and the like.

Specific examples of the sulfinyl group include, for example, 3-phenoxypropylsulfinyl and the like.

Specific examples of the phosphonyl group include, for example, phenoxyphosphonyl, octyloxyphosphonyl, phenylphosphonyl and the like.

Specific examples of the aryloxycarbonyl group include, for example, phenoxycarbonyl and the like.

Specific examples of the acyl group include, for example, acetyl, 3-phenylpropanoyl, benzoyl and the like.

Specific examples of the alkylsulfonylalkyl group include, for example, 2-methylsulfonylethyl and the like.

Specific examples of the aryloxyalkyl group include, for example, 3-phenoxypropyl and the like.

Specific examples of the halogenoalkyl group include, for example, trifluoromethyl and the like.

With regard to the above $W_1$ to $W_4$, it is particularly preferred that at least one of them is a group represented by the following formula (2) and the rest groups are hydrogen atoms.

$$-\overset{O_2}{S}-L-R \qquad (2)$$

In the above formula, L and R have the same meanings as the above.

More specifically, L represents a substituted or unsubstituted alkylene group having a total carbon number of C1 to C20, a substituted or unsubstituted cycloalkylene group having a total carbon number of C3 to C20, a substituted or unsubstituted alkenylene group having a total carbon number of C2 to C20, a substituted or unsubstituted alkynylene group having a total carbon number of C2 to C20, a substituted or unsubstituted aralkylene group having a total carbon number of C7 to C20, a substituted or unsubstituted phenylene group having a total carbon number of C6 to C18, a substituted or unsubstituted naphthylene group having a total carbon number of C10 to C20 and a substituted or unsubstituted divalent heterocyclic group having a total carbon number of C4 to C12. Unsubstituted ones are more preferable than ones having a substituent.

R represents an ionic hydrophilic group.

Preferable L among the above can include a substituted or unsubstituted alkylene group having a total carbon number of C1 to C20, a substituted or unsubstituted cycloalkylene group having a total carbon number of C3 to C20, a substituted or unsubstituted phenylene group having a total carbon number of C6 to C18, a substituted or unsubstituted naphthylene group having a total carbon number of C10 to C20 and a substituted or unsubstituted divalent heterocyclic group having a total carbon number of C4 to C12; and more preferable L can include a substituted or unsubstituted alkylene group having a total carbon number of C1 to C20, a substituted or unsubstituted phenylene group having a total carbon number of C6 to C18 and a substituted or unsubstituted divalent heterocyclic group having a total carbon number of C4 to C12. Further preferable L can include a substituted or unsubstituted alkylene group having a total carbon number of C1 to C20 and a substituted or unsubstituted phenylene group having a total carbon number of C6 to C18. Most preferably, a substituted or unsubstituted alkylene group having a total carbon number of C1 to C20 is particularly preferable. As the substituent, a halogen atom, sulfo or carboxy is preferable and a sulfo group is more preferable.

When the above L is an alkylene group having a total carbon number of C1 to C20, it is desirably a linear or branched unsubstituted alkylene group of C1 to C20, preferably C1 to C12, more preferably C1 to C8 and particularly preferably C2 to C6 in view of solubility. Among linear ones and branched ones, linear ones are more preferable. Specific examples thereof include, for example, methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene and eicocylene.

When the above group has an asymmetric carbon atom, a coloring matter having said group is preferably in racemic form because it has a larger solubility.

The substituted or unsubstituted cycloalkylene group having a total carbon number of C3 to C20 in the above L includes a cycloalkylene group of preferably C3 to C12 and more preferably C3 to C8. Among substituted ones and unsubstituted ones, unsubstituted ones are preferable. Specific examples thereof include, for example, cyclopropanediyl, cyclobutanediyl, cyclopentanediyl, cyclohexanediyl, cycloheptanediyl, cyclooctanediyl and the like.

The substituted or unsubstituted alkenylene group having a total carbon number of C2 to C20 in the above L includes an alkenylene group of preferably C2 to C12 and more preferably C2 to C8. Among substituted ones and unsubstituted ones, unsubstituted ones are preferable. Specific examples thereof include, for example, ethynyl, 1-propynyl, 2-propynyl, 1-butynyl, 1-octynyl, 3-methyl-1-butynyl and the like.

The substituted or unsubstituted alkynylene group having a total carbon number of C2 to C20 in the above L includes an alkynylene group of preferably C2 to C12 and more preferably C2 to C8. Among substituted ones and unsubstituted ones, unsubstituted ones are preferable. Specific examples thereof include, for example, ethynylene, 1-propynylene, 1-butynylene, 1-octynylene, 3-methyl-1-butynylene and the like.

The substituted or unsubstituted aralkylene group having a total carbon number of C7 to C20 in the above L includes an aralkylene group of preferably C7 to C12 and more preferably C8 to C10. Among substituted ones and unsubstituted ones, unsubstituted ones are preferable. Specific examples thereof include, for example, o-, m-, or p-xylylene, phenethylene and the like. In this regard, the group like the above phenethylene, where a cross-linking group L is formed by that either bond is directly linked to an alkyl moiety of aralkylene (which is ethylene in the case of phenethylene) and by that the other bond is linked to an aromatic ring, is included in the aralkylene group in the present description, for convenience.

The substituted or unsubstituted phenylene group having a total carbon number of C6 to C18 in the above L includes a phenylene group of preferably C6 to C12 and more preferably C6 to C10. Among substituted ones and unsubstituted ones, unsubstituted ones are preferable. Specific examples thereof include, for example, o-, m-, or p-phenylene, 2,5-diethyl-1,4-phenylene and the like.

The substituted or unsubstituted naphthylene group having a total carbon number of C10 to C20 in the above L includes a naphthylene group of preferably C10 to C12 and more preferably C10 to C11. Among substituted ones and unsubstituted ones, unsubstituted ones are preferable. Specific examples thereof include, for example, 1,4-naphthylene, 1,8-naphthylene, 2-methyl-1,4-naphthylene and the like.

For the substituted or unsubstituted divalent heterocyclic group having a total carbon number of C4 to C12 in L, 5- or 6-membered heterocyclic groups are preferable. They may be condensed. In addition, they may be aromatic heterocyclic groups or non-aromatic heterocyclic groups.

Examples of the divalent heterocyclic group represented by L are shown below in heterocyclic form while omitting the position used for cross-linking.

Examples of the heterocyclic ring of the heterocyclic group include a 6-membered heteroaromatic ring such as pyridine, pyrazine, pyrimidine, pyridazine and triazine; a bicyclo[4,4,0]-type condensed heteroaromatic ring such as quinoline, isoquinoline, quinazoline, cinnoline, phthalazine and quinoxaline; a 5-membered heteroaromatic ring such as pyrrole, furan, thiophene, pyrazole, imidazole, triazole, oxazole, thiazole, isothiazole, thiadiazole and isoxazole; a bicyclo[4,3,0]-type condensed heteroaromatic ring such as indole, benzofuran, benzothiophene, benzimidazole, benzoxazole, benzothiazole, benzisothiazole and benzisoxazole; a 5- or 6-membered non-aromatic heterocyclic ring such as pyrrolidine, piperidine, piperazine, imidazolidine, thiazoline; and the like.

The bond positions in the above heterocyclic ring are not limited and may be any as long as they are two bond positions which can form a divalent cross-linking group. For example, in the case of pyridine, adjacent sulfonyl and R may be cross-linked at any of "2,3-diyl", "2,4-diyl", "2,5-diyl", "2,6-diyl", "3,4-diyl", "3,5-diyl" or "3,6-diyl"

Among them, an aromatic heterocyclic group is preferable. Examples of the preferable aromatic heterocyclic ring include pyridine, pyrazine, pyrimidine, pyridazine, triazine, pyrazole, imidazole, benzimidazole, triazole, thiazole, benzothiazole, isothiazole, benzisothiazole and thiadiazole.

When L has a substituent, example of the substituent can include a halogen atom and the like. In addition, L may optionally have, as a substituent thereon, a group of the ones listed as a "group having an ionic hydrophilic group as a substituent" and as an "ionic hydrophilic group" described above.

In the above examples of L, the most preferable group is an unsubstituted C1 to C20 alkylene group, preferably a C1 to C12 alkylene group, more preferably a C1 to C8 alkylene group and further preferably a C2 to C6 alkylene group. Most preferable is a C2 to C4 alkylene group, and among them, a propylene group is more preferable.

In the formula (2), R represents an ionic hydrophilic group. Any of these may be the same as those in the case that the above $W_1$ to $W_4$ are ionic hydrophilic groups, including the specific examples, the preferable ones and the like. If described to be sure, more preferable ones as R are a carboxy group or a sulfo group and a sulfo group is most preferable.

The above n is 1 to 24. As n is larger, the solubility tends to be improved but the water fastness tends to be decreased, whereby the number of n should be appropriately controlled in view of solubility and water fastness.

n is usually 1 to 24, more preferably 2 to 16, further preferably 3 to 12 and particularly preferably 5 to 12. Most preferable is 5 to 9.

With regard to the above M, X, $W_1$ to $W_4$, L, R and n, a combination of preferable ones is more preferable and a combination of more preferable ones is further preferable. In addition, the same holds for a combination of further preferable ones.

Specifically, preferable combinations thereof will be described below.

(1) A combination where M is a hydrogen atom, a metal atom, a metal oxide, a metal hydroxide or a metal halide, X is a carbonyl group, $W_1$ and $W_4$ are hydrogen atoms, at least one of $W_2$ and $W_3$ is a group of the formula (2), the rest $W_2$ or $W_3$ is a hydrogen atom and n is an integer number of 5 to 12, and in the formula (2), L is C2 to C6 alkylene and R is a carboxy group or a sulfo group.

(2) A more preferable combination where in the above (1) $W_2$ is a group of the formula (2) and $W_3$ is a hydrogen atom.

(3) A further preferable combination where in the above (1) or (2) R is a sulfo group.

(4) An additionally further preferable combination where in the above (1) to (3), M is Cu or VO.

(5) Moreover, an additionally further preferable combination where in the above (1) to (4) n is an integer number of 5 to 9 and L in the formula (2) is C2 to C4 alkylene, particularly propylene.

The method for producing the coloring matter of the formula (1) in the present invention will be described below.

In order to synthesize the coloring matter of the formula (1), a naphthalocyanine compound represented by the following formula (5) and a compound represented by the following formula (3) or a compound represented by the following formula (4) and paraformaldehyde may be condensed by dehydration by, for example, the method described in JP 3413223 or a method on the basis of the method.

Any of the compounds represented by the following formulas (3) to (5) can be synthesized by a known method, and it is also available as a commercial product.

The dehydration condensation agent to be used for said condensation includes sulfuric acid, fuming sulfuric acid, methanesulfonic acid, polyphosphoric acid, acetic anhydride, phosphorus pentoxide and the like, but it is not limited to these. In addition, the above dehydration condensation agents can be also used in combination of one or more kinds thereof.

Formula (3)

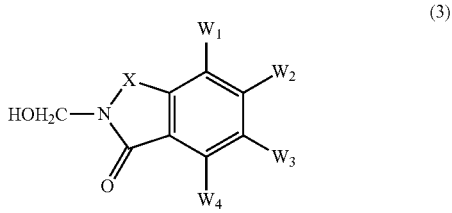

(3)

Formula (4)

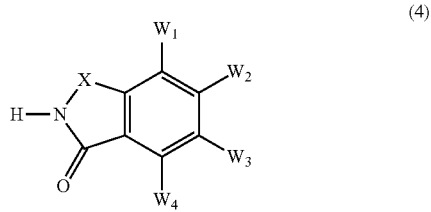

(4)

Formula (5)

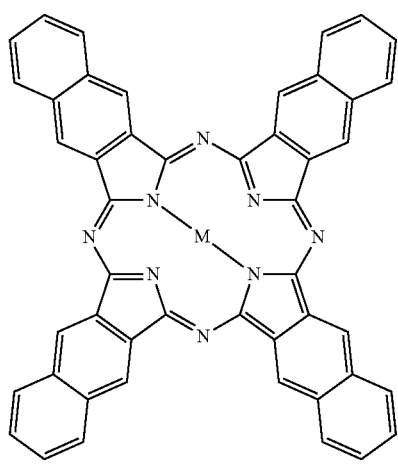

(5)

Usually, the dehydration condensation agent is also used to serve as a solvent, and its amount to be used is 5 to 20 times and preferably 8 to 15 times by weight ratio of the compound represented by above formula (5). The reaction temperature is usually 50 to 160° C. and varies depending on the reaction conditions such as the number of the phthalimide methyl group to be introduced and the kind of the dehydration condensation agent. The reaction time similarly varies depending on the reaction temperature, the reaction conditions and the like, but it is usually 1 to 20 hours.

The use amount of the compound represented by the formula (3) varies depending on the number of the phthalimide methyl group to be introduced, and usually the molar quantity of the desired number to be introduced is used relative to 1 mol of the compound represented by the formula (5). For example, when 1 to 8 mol thereof is used relative to 1 mol of the compound represented by the formula (5), it is possible that 1 to 8 phthalimide methyl groups are introduced. It is also possible to use the compound represented by the formula (4) and paraformaldehyde instead of the compound represented by the formula (3), and in this case, the use amount of the compound represented by the formula (4) is the same as in the case of the compound of the formula (3). Paraformaldehyde is usually used in an amount of 1 to 2 molar times of the compound represented by the formula (4).

The thus-obtained coloring matter of the present invention can be separated by aciding out or salting out. For aciding out, for example, the pH of a reaction liquid is adjusted to pH 1 to 3 with an acid such as hydrochloric acid and sulfuric acid to precipitate coloring matter. The temperature at this time is not particularly limited but it is usually 20 to 80° C. and preferably 20 to 60° C.

It is preferred that salting out is carried out in, for example, the acidic to alkaline range, preferably in the range of pH 1 to 11. The temperature in salting out is not particularly limited but usually 20 to 80° C. and preferably 40 to 70° C., and it is preferred that salting out is carried out by heating the reaction liquid to the temperature and then by adding a salt such as sodium chloride thereto. In addition, it is possible to separate an intended coloring matter by adding a poor solvent.

The coloring matter of the present invention is suitable as a near-infrared ray absorbent, and can be used for various applications described in the above Background Art for that purpose and the like. In addition, it is used to dye natural and synthetic textiles or textile blend and further to produce inks for writing and water-based ink compositions for inkjet recording. Particularly, the coloring matter of the formula (1) of the present invention has a high solubility in water and its aqueous solution also has an excellent storage stability, whereby it is suitable as a water-based near-infrared ray absorbing ink.

The coloring matter solution of the formula (1) of the present invention can be obtained by dissolving the coloring matter of the formula (1) in water. The content of coloring matter of the formula (1) in this aqueous solution is 0.01 to 20% by mass, preferably 0.05 to 5% by mass, more preferably 0.05 to 1% by mass in some cases and further preferably 0.07 to 0.5% by mass relative to the whole aqueous solution, in terms of stability of the aqueous solution. Said aqueous solution may contain, according to necessity, any additive in an amount of 0 to 50% by mass and preferably about 0 to 30% by mass relative to the whole aqueous solution, and the rest is water. This aqueous solution is used to dye various things with the coloring matter of the formula (1). For example, it is also possible to use said aqueous solution as an application liquid, as it is. In addition, it is possible to use it as a water-based ink composition, as it is or by adding a water-soluble organic solvent and another ink preparation agent according to necessity.

It is also possible that the reaction liquid containing the coloring matter of the formula (1) of the present invention is directly used to produce the water-based ink composition of the present invention. However, it is also possible that said coloring matter is separated from the reaction liquid, for example, separated by drying of reaction liquid by a method such as spray-drying, and then the resulting coloring matter is processed into an ink composition. The water-based ink composition of the present invention contains the coloring matter represented by the above formula (1) in an amount of usually 0.01 to 20% by mass, preferably 0.1 to 20% by mass, more preferably 1 to 10% by mass and further preferably 2 to 8% by mass in the aqueous solution. In addition, in some cases, the ink composition containing 0.05 to 10% by mass of the coloring matter represented by the above formula (1) is also preferable.

The water-based ink composition of the present invention is a composition where the coloring matter of the above formula (1) is dissolved in an aqueous medium such as water or a mixed solution of water with a water-soluble organic solvent (a water-miscible organic solvent) and, according to necessity, an ink preparation agent is added. When this ink composition is used as an ink for inkjet printer, it is preferred to use the ink composition having less content of inorganic substances such as metal cation chloride, for example sodium chloride, sulfate, for example sodium sulfate, and the like which are contained as impurities. In this case, for example, the total content of sodium chloride and sodium sulfate is about 1% by mass or less in the total mass of the coloring matter contained in the ink. In order to produce the coloring matter containing less inorganic impurity, desalting treatment may be carried out, for example, by a method using a reverse osmosis membrane known per se or by a method where the coloring matter of the present invention or a dried form or a wet cake of a salt thereof is stirred in a mixed solvent of alcohol such as methanol with water for suspension purification, and the solid is obtained by filtration and dried.

The water-based ink composition of the present invention is prepared using water as a medium, and according to necessity, it may contain a water-soluble organic solvent within the range not impairing the effects of the Invention. The water-soluble organic solvent is used as a dye dissolving agent, a drying preventive agent (wetting agent), a viscosity modifier, a penetration enhancer, a surface tension modifier, an antifoaming agent and the like. The other ink preparation agents include, for example, known additives such as an antiseptic and fungicide, a pH adjuster, a chelating agent, a rust preventive agent, an ultraviolet absorbing agent, a viscosity modifier, a dye dissolving agent, an antifading agent, an emulsion stabilizer, a surface tension modifier, an antifoaming agent, a dispersing agent and a dispersion stabilizer. The content of the water-soluble organic solvent is 0 to 60% by mass and preferably 10 to 50% by mass relative to the whole ink, and it is good to use the ink preparation agent in an amount of 0 to 20% by mass and preferably 0 to 15% by mass relative to the whole ink. The content of the coloring matter of the formula (1) in this water-based ink composition is 0.01 to 10% by mass, preferably 0.05 to 5% by mass, more preferably 0.05 to 1% by mass in some cases and further preferably 0.07 to 0.5% by mass relative to said composition, in terms of stability of said composition. The rest other than the above is water.

The water-soluble organic solvent which can be used in the present invention includes, for example, C1 to C4 alkanol such as methanol, ethanol, n-propanol, isopropanol, n-butanol, isobutanol, secondary butanol and tertiary butanol; amides such as N,N-dimethylformamide or N,N-dimethyl acetamide; heterocyclic ketone such as 2-pyrrolidone, N-methyl-2-pyrrolidone, hydroxyethyl-2-pyrrolidone, 1,3-dimethylimidazolidin-2-one or 1,3-dimethylhexahydropyrimid-2-one; ketone or keto alcohol such as acetone, methyl ethyl ketone and 2-methyl-2-hydroxypentan-4-one; cyclic ether such as tetrahydrofuran and dioxane; mono-, oligo- or polyalkylene glycol or thioglycol having a (C2 to C6) alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol or thiodiglycol; polyol (triol) such as trimethylolpropane, glycerine and hexane-1,2,6-triol; (C1 to C4) monoalkyl ether of polyhydric alcohol such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether; gamma-butyrolactone or dimethylsulfoxide and the like.

In this regard, the above water-soluble organic solvent also contains substances which are solid at ordinary temperature, such as trimethylolpropane and the like, but these are described as in the category of water-soluble organic solvent in the present description for convenience because these are solid but water-soluble and can be used for the same purpose as for the water-soluble organic solvent when dissolved in water.

As the above water-soluble organic solvent, preferable are isopropanol, glycerine, mono, di- or triethylene glycol, dipropylene glycol, 2-pyrrolidone, N-methyl-2-pyrrolidone and butyl carbitol, and more preferably are isopropanol, glycerine, diethylene glycol, 2-pyrrolidone, N-methyl-2-pyrrolidone and butyl carbitol. These water-soluble organic solvents are used alone or as a mixture thereof.

The antiseptic and fungicide includes, for example, compounds such as organic sulfur-based, organic nitrogen sulfur-based, organic halogen-based, haloallylsulfone-based, iodopropargyl-based, N-haloalkylthio-based, benzothiazole-based, nitrile-based, pyridine-based, 8-oxyquinoline-based, isothiazoline-based, dithiol-based, pyridineoxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based and the like.

The organic halogen-based compound includes, for example, sodium pentachlorophenol, the pyridineoxide-based compound includes, for example, sodium 2-pyridinethiol-1-oxide, the isothiazoline-based compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like.

In addition, the antiseptic and fungicide other than above includes sodium acetate, sodium sorbate, sodium benzoate and the like. Other specific examples of the antiseptic and fungicide preferably include, for example, Proxel GXL(S) and Proxel XL-2(S) which are trade names and manufactured by Avecia Corp., and the like.

As the pH adjuster, any substance can be used as long as it can control the pH of the ink in the range of 6.0 to 11.0 for the purpose of improving storage stability of the ink. It includes, for example, alkanolamine such as diethanolamine and triethanolamine, alkali metal hydroxide such as lithium hydroxide, sodium hydroxide and potassium hydroxide, ammonium hydroxide, alkali metal carbonate such as lithium carbonate, sodium carbonate and potassium carbonate, or the like.

The chelating agent includes, for example, sodium ethylenediaminetetraacetate, sodium nitrilotriacetate, sodium hydroxyethylethylenediaminetriacetate, sodium diethylenetriaminepentaacetate, sodium uracildiacetate and the like.

The rust preventive agent includes, for example, hydrogen sulfite salt, sodium thiosulfate, ammonium thioglycolate, diisopropylammonium nitrite, pentaerythritol tetranitrate, dicyclohexylammonium nitrite and the like.

As the ultraviolet absorbing agent, for example, benzophenone-based compounds, benzotriazole-based compounds, cinnamic acid-based compounds, triazine-based compounds and stilbene-based compounds can be used.

The viscosity modifier includes, in addition to the water-soluble organic solvent, water-soluble polymer compounds, for example, polyvinyl alcohol, cellulose derivatives, polyamine, polyimines and the like.

The dye dissolving agent includes, for example, urea, epsilon-caprolactam, ethylene carbonate and the like. It is preferred to use urea.

The antifading agent is used for the purpose of improving storage stability of images. As the antifading agent, various organic-based and metal complex-based antifading agents can be used. The organic antifading agent includes hydroquinones, alkoxyphenols, dialkoxyphenols, phenols, anilines, amines, indanes, chromans, alkoxyanilines, heterocyclic rings and the like, and the metal complex includes nickel complex, zinc complex and the like.

The surface tension modifier includes surfactants, for example, an anionic surfactant, an amphoteric surfactant, a cationic surfactant, a nonionic surfactant and the like.

The anionic surfactant includes alkylsulfocarboxylate, alpha-olefin sulfonate, polyoxyethylene alkyl ether acetate, N-acylamino acid and a salt thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol-type phosphate ester, alkyl-type phosphate ester, alkylallylsulfonate, diethyl sulfosuccinate, diethylhexyl sulfosuccinate, dioctyl sulfosuccinate and the like.

The cationic surfactant includes 2-vinylpyridine derivatives, poly(4-vinylpyridine) derivatives and the like.

The amphoteric surfactant includes lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

The nonionic surfactant includes ether-type such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-type such as polyoxyethylene oleic acid, polyoxyethylene oleate ester, polyoxyethylene distearate ester, sorbitan laurate, sorbitan monostearate, sorbitan monooleate, sorbitan sesquioleate, polyoxyethylene monooleate and polyoxyethylene stearate; acetylene glycol (alcohol)-type such as 2,4,7,9-tetramethyl-5-decyne-4,7-diol, 3,6-dimethyl-4-octyne-3,6-diol, and 3,5-dimethyl-1-hexyn-3-ol (for example, Surfynol 104, 82 and 465, Olfine STG and the like which are trade names and manufactured by Nissin Chemical Industry Co., Ltd.); polyglycol ether-type (for example, Tergitol 15-S-7 and the like manufactured by SIGMA-ALDRICH); and the like.

As the antifoaming agent, highly oxidized oil-based, glycerine fatty acid ester-based, fluorine-based, silicone-based compounds are used according to necessity.

These water-based ink preparation agents are used alone or as a mixture thereof. In this regard, the surface tension of the ink of the present invention is usually 25 to 70 mN/m and more preferably 25 to 60 mN/m. In addition, the viscosity of the ink of the present invention is preferably 30 mPa·s or less, and it is more preferable that it is adjusted to 20 mPa·s or less.

In production of the water-based ink composition of the present invention, there is no particular limitation to the order of dissolving agents such as additives. In preparation of the ink, water to be used is preferably water in which the amount of impurities is smaller, such as ion-exchanged water or distilled water. In addition, using a membrane filter or the like according to necessity, microfiltration may be carried out to remove foreign substances, and it is preferred to carry out microfiltration when it is used as an ink for inkjet printer. The pore size of filter to be used for microfiltration is usually 1 micron to 0.1 micron and preferably 0.8 micron to 0.2 micron.

The water-based ink composition containing the coloring matter of the present invention is suitable for use in impress printing, copying, marking, writing, drafting, stamping or recording (printing), particularly in inkjet recording. In addition, the water-based ink composition of the present invention has a high storage stability, and thus change in quality such as decrease in absorbance is small even when it is left for a long period of time.

EXAMPLES

Hereinafter, the present invention will be further explained more specifically with reference to the examples. In this regard, "part(s)" and "%" in this text are based on mass unless otherwise specifically noted.

In addition, n values (the number of substituents) in the formulas (6) and (9) in the following examples are determined by measuring the ratio of the central metal of naphthalocyanine and the sulfur atom and the like which are contained in the introduced substituent, using an X-ray fluorescence spectrometer (RIX-3000: manufactured by Rigaku Corporation).

In this regard, the coloring matters represented by the following formulas (6) and (7) which are synthesized in the examples are mixtures of compounds where all n values are some different from one another, and n value is shown as an integer number by rounding the average value.

In addition, although raw materials of the coloring matters represented by the above formula (1) have the same molar ratio in synthesis, there is some range in the number of n in the obtained coloring matters according to synthesis conditions, for example, the conditions of raising reaction temperature and the like. For example, n in the compounds obtained in the following examples is an integer number ranging from 5 to 8 by rounding to the integer number (from 5.1 to 8.4 as a value down to the first decimal place before rounding).

Further, the solubility in water (at room temperature) is at least 200 g/L in any the coloring matters of the formula (1) obtained in the present examples.

Example 1

Synthesis of the Coloring Matter Represented by the Following Formula (6) (n=7 to 8)

(A coloring matter of the above formula (1) wherein M is VO, X is carbonyl, n is an integer number of 7 to 8, $W_1$, $W_3$ and $W_4$ are hydrogen atoms, $W_2$ is the above formula (2), and in the formula (2), L is propylene and R is sulfo)

Formula (6):

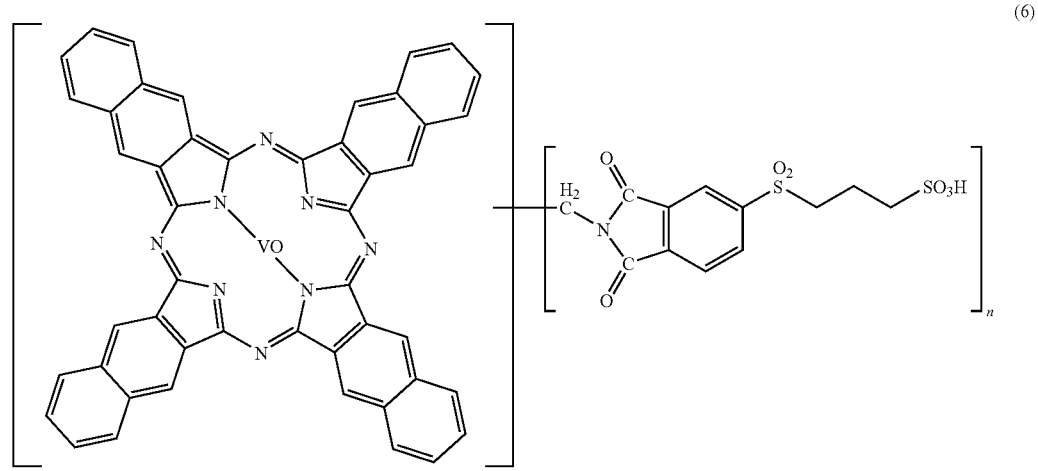

To 40 parts of polyphosphoric acid (116%), 3.9 parts of vanadyloxynaphthalocyanine, 15.6 parts of sodium 3-(phthalimid-4-ylsulfonyl)propane sulfonate, 1.3 parts of paraformaldehyde were added, and the liquid temperature was raised to 140° C. After the mixture was reacted at 140 to 145° C. for 8 hours, the reaction liquid was cooled to 60° C., water and isopropylalcohol were added thereto, and the precipitated solid was separated by filtration and dried to obtain 9.5 parts of an intended coloring matter as a brownish green powder.
λmax: 754 nm (in water)

Example 2

Aqueous Solution Composition and Storage Stability Test

In 100 parts of water, 0.1 part of the naphthalocyanine coloring matter of the present invention obtained in the above Example 1 was dissolved to prepare an aqueous solution composition (water-based ink composition) of the present invention. In this regard, ion-exchanged water was used as water.

The prepared aqueous solution composition (water-based ink composition) was left in an oven at 50° C. for 50 days to conduct storage stability test. Before and after the test, the absorbance of the aqueous solution composition (water-based ink composition) was measured by a spectrophotometer (UV-3150: manufactured by Shimadzu Corporation), and evaluation of storage stability was conducted on absorbance change in the maximum absorption wavelength. The results are shown in Table 1 described later.

In addition, the present aqueous solution composition can be used, as it is, as an ink for applying, an ink for inkjet printing, and the like.

Comparative Example 1

For comparison, in the same manner as in Example 2 except that a naphthalocyanine coloring matter represented by the following formula (7) was used instead of the naphthalocyanine coloring matter of the present invention of the above formula (6), an aqueous solution composition (water-based ink composition) was prepared and evaluated. This is Comparative Example 1. The results are shown in Table 1 described later.

In this regard, the coloring matter represented by the following formula (7) was synthesized as follows.

Reference Synthesis Example 1

Synthesis of the Coloring Matter Represented by the Following Formula (7) of Comparative Example 1

To 10 parts of fuming sulfuric acid, 1 part of vanadyloxynaphthalocyanine obtained as a commercial product was added, the mixture was reacted at room temperature for 10 hours and at 50° C. for 2 hours, and then the reaction liquid was cooled to room temperature. The resulting reaction liquid was poured into ice water, sodium chloride was added thereto, and the precipitated solid was separated by filtration, washed with a 90% aqueous methanol solution and dried to obtain 0.4 parts of sodium salt of a coloring matter represented by the following formula (7) which was to be used in Comparative Example 1.
λmax: 754 nm (in water)

Formula (7)

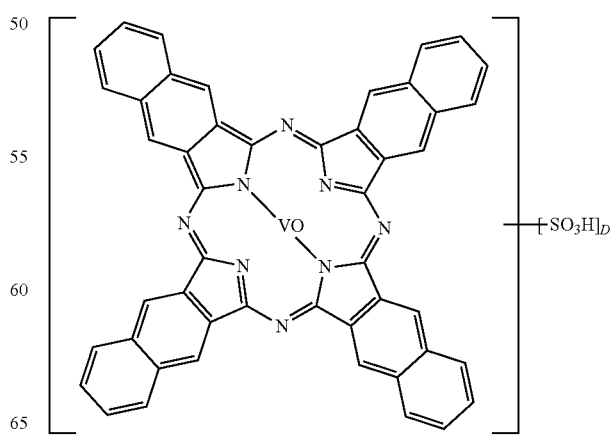

Comparative Example 2

For comparison, in the same manner as in Example 2 except that a naphthalocyanine coloring matter was represented by the following formula (8) was used instead of the naphthalocyanine coloring matter of the present invention of the above formula (6), an aqueous solution composition (water-based ink composition) was prepared and evaluated. This is Comparative Example 2. The results are shown in Table 1 described later.

The compound represented by the following formula (8) was synthesized as follows.
Synthesis of the Compound of Comparative Example 2 (the Compound of the Formula (8));
Synthesis of the Coloring Matter Represented by the Following Formula (8):

To 20 parts of fuming sulfuric acid, 2 parts of copper naphthalocyanine was added, the mixture was reacted at 60° C. for 9 hours, and then the resulting reaction liquid was cooled to room temperature. The reaction liquid was poured into ice water, the mixture was concentrated, and the precipitated solid was separated by filtration, washed with a 90% aqueous methanol solution and dried to obtain 0.8 parts of a coloring matter represented by the following formula (8) which was to be used in Comparative Example 2.

The amount of the sulfonic acid group introduced into this compound was determined by a mass spectrometry using LC-MS (LC: HP-1100, manufactured by Agilent Technologies Japan, Ltd./MS: LCT, manufactured by Micromass Ltd.).
λmax: 715 nm (in water)

Formula (8)

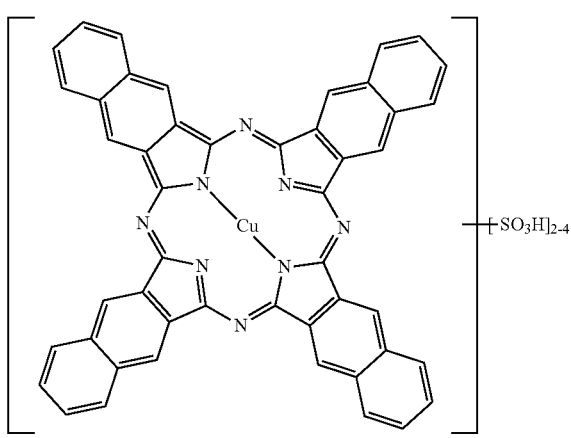

(8)

TABLE 1

(storage stability test)

| | Coloring matter residual rate (%) in aqueous solution (ink composition) | |
|---|---|---|
| | Before test | After test |
| Example 2 | 100 | 82 |
| Comparative Example 1 | 100 | 9 |
| Comparative Example 2 | 100 | 33 |

As is clear from the results of Table 1, the aqueous solution (ink composition) of each Comparative Example has a small coloring matter residual rate of 9% or 33% after the test, while the aqueous solution (ink composition) of the present invention has a high value of 82% showing that it is found to be an ink composition having an extremely excellent storage stability.

Example 3

(1) Synthesis of the Coloring Matter Represented by the Above Formula (6) (n=5)

(A compound of the formula (1) wherein M is VO, X is carbonyl, n is an integer number of 5, $W_1$, $W_3$ and $W_4$ are hydrogen atoms, $W_2$ is the above formula (2), and in the formula (2), L is propylene and R is sulfo)

To 135 parts of polyphosphoric acid (116%), 13.0 parts of vanadyloxynaphthalocyanine, 52.2 parts of sodium 3-(phthalimid-4-ylsulfonyl)propane sulfonate and 4.4 parts of paraformaldehyde were added, and the liquid temperature was raised to 135° C. After the mixture was reacted at 137 to 140° C. for 8 hours, the reaction liquid was cooled to 50° C., 150 parts of water and 480 parts of isopropylalcohol were added thereto, and the precipitated solid was separated by filtration and dried to obtain 37.6 parts of an intended coloring matter as a brownish green powder.
λmax: 759 nm (in water)

(2) Synthesis of Sodium Salt of Coloring Matter Represented by the Above Formula (6) (n=5)

To 10 parts of water, 1.7 parts of the coloring matter represented by the above formula (6) (n=5) obtained in Example 3 (1) was added, and further, 1.0 parts of 25% sodium hydroxide was added to obtain an aqueous solution. This aqueous solution was added to 160 parts of methanol. Further thereto, 120 parts of isopropylalcohol was added. The precipitated solid was separated by filtration and dried to obtain 1.6 parts of sodium salt of the coloring matter obtained in Example 3 (1) as a green-brown powder.
λmax: 806 nm (in water)

Example 4

(1) Synthesis of the Coloring Matter Represented by the Above Formula (6) (n=6)

(A coloring matter of the above formula (1) wherein M is VO, X is carbonyl, n is an integer number of 6, $W_1$, $W_3$ and $W_4$ are hydrogen atoms, $W_2$ is the above formula (2), and in the formula (2), L is propylene and R is sulfo)

To 65 parts of polyphosphoric acid (116%), 6.5 parts of vanadyloxynaphthalocyanine, 26.1 parts of sodium 3-(phthalimid-4-ylsulfonyl)propane sulfonate and 2.2 parts of paraformaldehyde were added, and the liquid temperature was raised to 140° C. After the mixture was reacted at 142 to 145° C. for 7.5 hours, the reaction liquid was cooled to 50° C., 70 parts of water and 160 parts of isopropylalcohol were added thereto, and the precipitated solid was separated by filtration and dried to obtain 17.4 parts of an intended coloring matter as a brownish green powder.
λmax: 761 nm (in water)

(2) Synthesis of Sodium Salt of the Coloring Matter Represented by the Above Formula (6) (n=6)

To 16 parts of water, 3.5 parts of the coloring matter represented by the above formula (6) (n=6) obtained in Example 4 (1) was added, and further, 8.0 parts of 25% sodium hydroxide was added to obtain an aqueous solution. This aqueous solution was added to 320 parts of methanol. The precipitated solid was separated by filtration and dried to obtain 3.0 parts of sodium salt of the coloring matter obtained in Example 4 (1) as a green-brown powder.
λmax: 813 nm (in water)

Example 5

Synthesis of a Coloring Matter Represented by the Following Formula (9) (n=5)

(A coloring matter of the above formula (1) wherein M is Cu, X is carbonyl, n is an integer number of 5, $W_1$, $W_3$ and $W_4$ are hydrogen atoms, $W_2$ is the above formula (2), and in the formula (2), L is propylene and R is sulfo)

Formula (9):

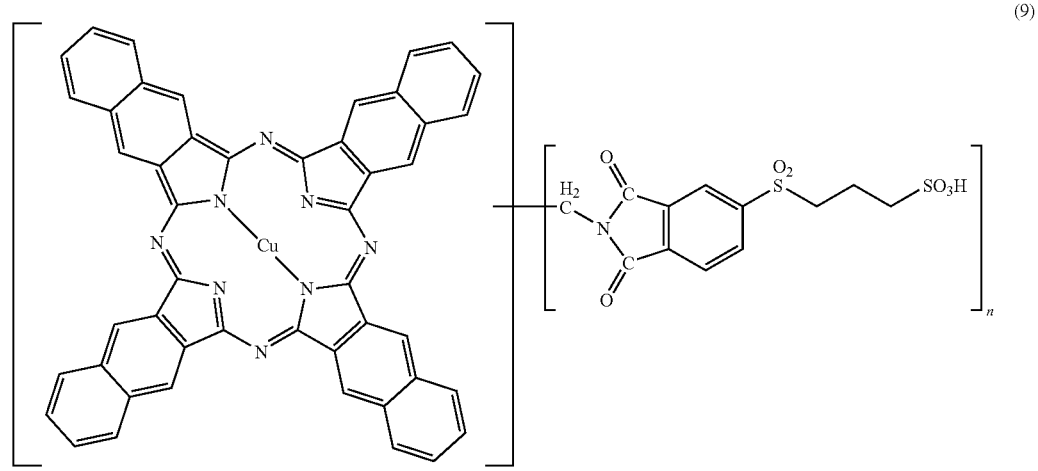

(9)

To 40 parts of polyphosphoric acid (116%), 3.9 parts of copper naphthalocyanine, 15.6 parts of sodium 3-(phthalimid-4-ylsulfonyl)propane sulfonate and 1.3 parts of paraformaldehyde were added, and the liquid temperature was raised to 140° C. After the mixture was reacted at 141 to 146° C. for 6 hours, the reaction liquid was cooled to 50° C., 50 parts of water and 80 parts of isopropylalcohol were added thereto, and the precipitated solid was separated by filtration and dried to obtain 12.2 parts of an intended coloring matter as a dark green powder.
λmax: 706 nm (in water)

In addition, using the obtained coloring matter, storage stability test was conducted in the same manner as in the above Example 2 except that the leaving time was 48 days instead of 50 days. As a result, the residual rate in the ink composition of the coloring matter represented by the above formula (9) was 93%.

Example 6

(A) Preparation of Ink

Ink compositions of the present invention were respectively obtained by using the compounds of the present invention obtained in the above Examples 1 or 4 and by mixing in the composition ratio shown in Table 2, and they were respectively filtered using a 0.45 μm membrane filter to remove foreign substances off. In this regard, ion-exchanged water was used as water, the pH of the ink composition was adjusted to pH=7 to 9 with a 25% aqueous sodium hydroxide solution, and then water was added to make the total amount 100 parts.

In this regard, "Surfynol® 104PG50" in the table is an acetylene glycol nonionic surfactant (which is a trade name; manufactured by Nissin Chemical Industry Co., Ltd.)

TABLE 2

| (composition ratio of ink composition) | |
|---|---|
| Compound obtained in Example 1 or Example 4 | 0.1 part |
| Glycerine | 5.0 parts |
| Urea | 5.0 parts |
| N-Methyl-2-pyrrolidone | 4.0 parts |
| Isopropylalcohol | 3.0 parts |

TABLE 2-continued

| (composition ratio of ink composition) | |
|---|---|
| Butyl carbitol | 2.0 parts |
| Surfynol$^{RTM}$ 104PG50 | 0.1 part |
| 25% Aqueous sodium hydroxide solution + water | Rest |
| Total | 100.0 parts |

INDUSTRIAL APPLICABILITY

The water-soluble naphthalocyanine coloring matter of the present invention or a salt thereof has an excellent solubility in water and water-soluble organic solvents. In addition, the aqueous solution composition (water-based ink composition) of the present invention containing this compound is free from crystal precipitation and change in physical properties and hue after storage for a long period of time, showing that it has an extremely good storage stability, and it is extremely suitably used for impress printing, copying, marking, writing, drafting, stamping or recording (printing), particularly as a near-infrared ray absorbing ink for inkjet recording.

The invention claimed is:
1. A water-based ink composition containing a water-soluble naphthalocyanine coloring matter represented by the following formula (1) or a salt thereof:

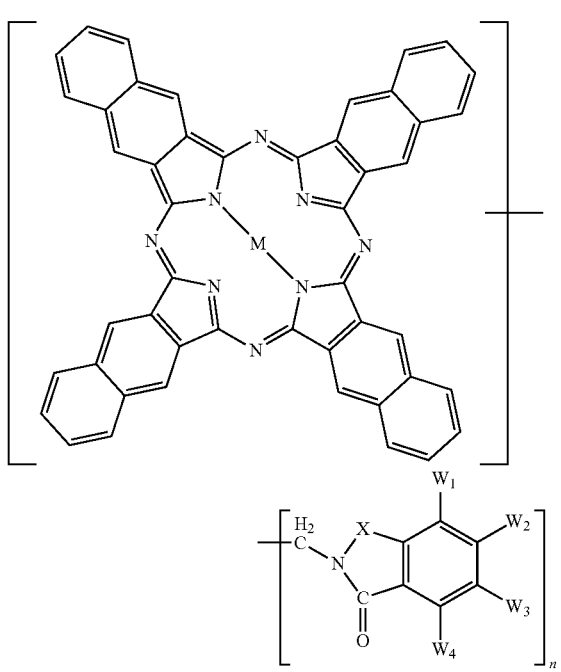

(1)

wherein,
M represents a hydrogen atom, a metal atom, a metal oxide, a metal hydroxide or a metal halide,
X represents a carbonyl group or a sulfonyl group,
$W_1$ to $W_4$ each independently represent a hydrogen atom or a group represented by the following formula (2):

(2)

wherein,
L represents a substituted or unsubstituted alkylene group having a total carbon number of C1 to C20; a substituted or unsubstituted cycloalkylene group having a total carbon number of C3 to C20; a substituted or unsubstituted alkenylene group having a total carbon number of C2 to C20; a substituted or unsubstituted alkynylene group having a total carbon number of C2 to C20; a substituted or unsubstituted aralkylene group having a total carbon number of C7 to C20; a substituted or unsubstituted phenylene group having a total carbon number of C6 to C18; a substituted or unsubstituted naphthylene group having a total carbon number of C10 to C20; or a substituted or unsubstituted divalent heterocyclic group having a total carbon number of C4 to C12, and R represents an ionic hydrophilic group, respectively;
and at least one of $W_1$ to $W_4$ is a group represented by the above formula (2), and
n represents an integer number of 1 to 24, respectively.

2. The water-based ink composition containing the water-soluble naphthalocyanine coloring matter or a salt thereof according to claim 1, wherein in the formula (1), $W_1$ and $W_4$ are hydrogen atoms, at least either $W_2$ or $W_3$ is represented by the above formula (2); and the rest of $W_2$ or $W_3$ is a hydrogen atom.

3. The water-based ink composition according to claim 1 or 2, which contains water and a water-soluble organic solvent.

4. The water-based ink composition according to claim 3, which is for inkjet recording.

5. A water-soluble naphthalocyanine coloring matter represented by the following formula (1) or a salt thereof:

(1)

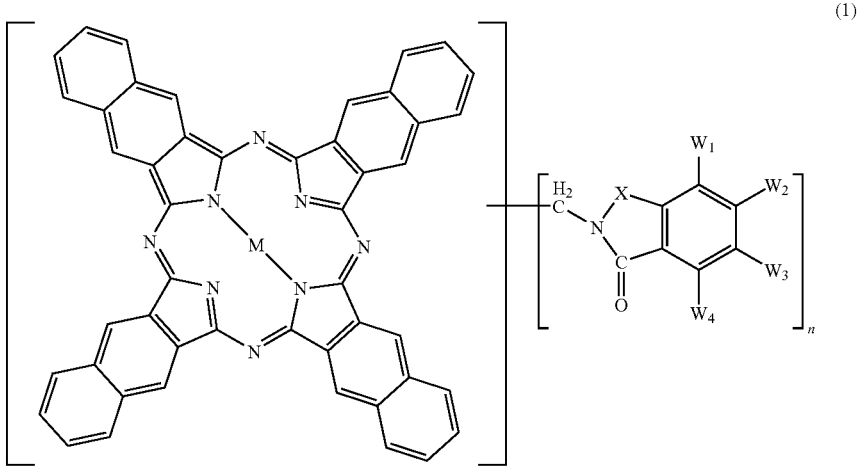

wherein,
M represents a hydrogen atom, a metal atom, a metal oxide, a metal hydroxide or a metal halide,
X represents a carbonyl group or a sulfonyl group,
$W_1$ and $W_4$ are hydrogen atoms,
at least either $W_2$ or $W_3$ is a group represented by the following formula (2):

(2)

wherein, L represents an unsubstituted alkylene group having a total carbon number of C2 to C6, and R represents an ionic hydrophilic group, respectively; and the rest of $W_2$ or $W_3$ is a hydrogen atom,
n represents an integer number of 1 to 24, respectively.

6. The water-soluble naphthalocyanine coloring matter or a salt thereof according to claim 5, wherein in the formula (1), X is a carbonyl group, n is 5 to 12, and R in the formula (2) is a sulfo group.

7. A water-soluble naphthalocyanine coloring matter represented by the following formula (1) or a salt thereof:

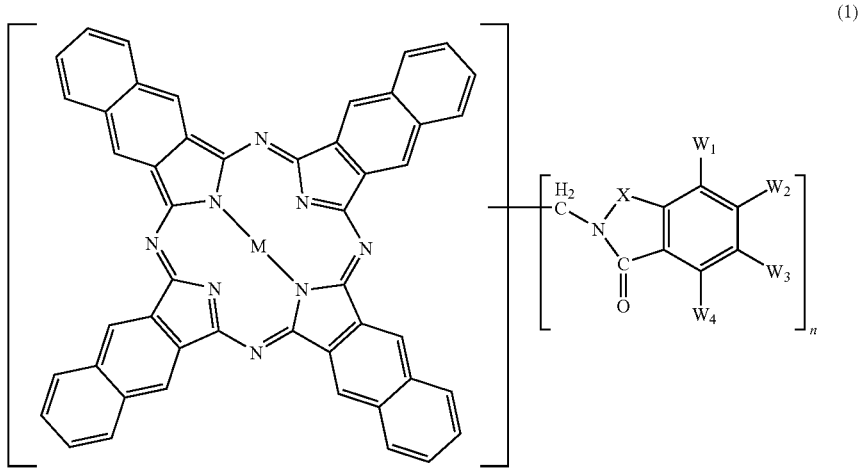

(1)

wherein,

M represents a hydrogen atom, a metal atom, a metal oxide, a metal hydroxide or a metal halide, X represents a carbonyl group or a sulfonyl group, $W_1$, $W_3$ and $W_4$ are hydrogen atoms, $W_2$ is the following formula (2):

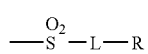

(2)

wherein, L represents linear C2 to C6 alkylene and R represents a sulfo group, and n represents an integer number of 5 to 12.

8. An aqueous solution composition containing the water-soluble naphthalocyanine coloring matter or a salt thereof according to any one of claim 5, 6 or 7.

9. A water-based ink composition, wherein the aqueous solution composition of claim 8 further contains a water-soluble organic solvent and an ink preparation agent.

10. A near-infrared ray absorbent comprising a water-soluble naphthalocyanine coloring matter represented by the following formula (1) or a salt thereof:

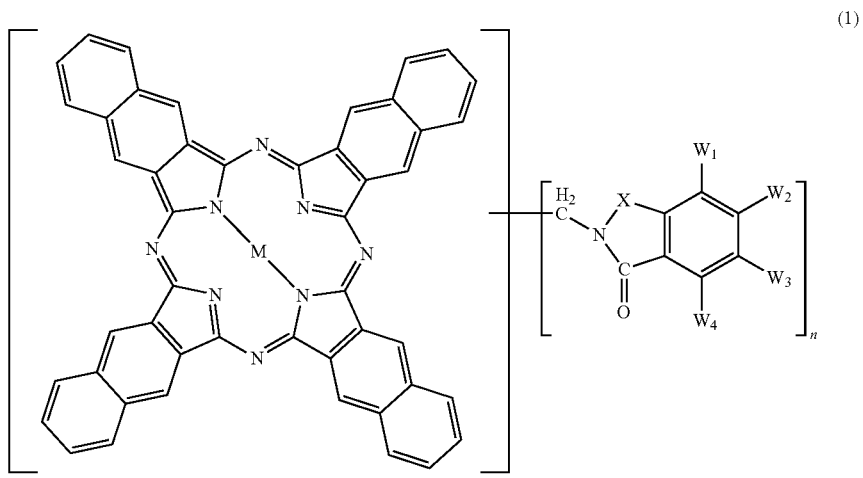

(1)

wherein,

M represents a hydrogen atom, a metal atom, a metal oxide, a metal hydroxide or a metal halide, X represents a carbonyl group or a sulfonyl group, $W_1$, $W_3$ and $W_4$ are hydrogen atoms, $W_2$ is the following formula (2):

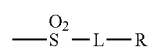

(2)

wherein, L represents linear C2 to C6 alkylene, and R represents a sulfo group, and n represents an integer number of 5 to 12.

* * * * *